United States Patent [19]

Bergmann

[11] 4,308,489
[45] Dec. 29, 1981

[54] METHOD AND APPARATUS FOR COORDINATING THE SPEEDS OF MOTIONS

[75] Inventor: Robert W. Bergmann, Marion, Ohio

[73] Assignee: Dresser Industries, Inc., Dallas, Tex.

[21] Appl. No.: 116,823

[22] Filed: Jan. 30, 1980

Related U.S. Application Data

[63] Continuation of Ser. No. 876,829, Feb. 9, 1978, abandoned.

[51] Int. Cl.³ .............................................. H02P 5/50
[52] U.S. Cl. ...................................... 318/77; 318/105; 318/80
[58] Field of Search ..................................... 318/68-71, 318/77, 11-13, 45, 46, 47, 67, 80, 105-109

[56] References Cited

U.S. PATENT DOCUMENTS

| | | | |
|---|---|---|---|
| 2,744,213 | 5/1956 | Jaeschke | 318/71 X |
| 3,118,097 | 12/1978 | Hettler | 318/70 |
| 3,199,008 | 8/1965 | Stone | 318/67 |
| 3,598,489 | 8/1971 | Thomas | 318/69 X |
| 3,728,596 | 4/1973 | Hermansson et al. | 318/71 X |
| 3,833,843 | 9/1974 | Bossons | 318/11 |
| 4,051,415 | 9/1977 | Martin | 318/77 |

Primary Examiner—B. Dobeck
Attorney, Agent, or Firm—Gerald L. Lett

[57] ABSTRACT

A method and apparatus for maintaining predetermined speed ratios between at least two motions are described. The speeds of the motive power sources for the motions are controlled by signals having values proportional to the ratio of those speeds, and in the alternative, if lower in value, reference signal which may be generated by an operator. The invention is described in connection with its application in a power shovel where it controls the ratio of crowd speed to hoist speed.

13 Claims, 4 Drawing Figures

METHOD AND APPARATUS FOR COORDINATING THE SPEEDS OF MOTIONS

This is a continuation of application Ser. No. 876,829, filed Feb. 9, 1978, now abandoned.

BACKGROUND OF THE INVENTION

This invention relates to a method and apparatus for controlling the speeds of at least two motions so as to maintain a prescribed relationship between them. More particularly, the invention relates to a method and apparatus for controlling the speeds of operation of two or more sources of motive power, so as to maintain a prescribed relationship between those speeds and thereby maintain a desired speed relationship between motions driven by those sources.

In a wide variety of industries and applications, drive systems are utilized which require the use of two or more sources of motive power, e.g. electric motors, wherein it is mandatory that a given difference between speeds of the two motors be maintained in order to achieve a given result. The latter difference in speeds is generally described in terms of the ratio of the speed of one motor with respect to the speed of the other motor and is commonly termed "draw ratio".

Generally speaking, the successive motors in a drive system are in effect in a "master-slave" relationship wherein a change in speed in a preceeding motor, the master motor, will bring about a change in speed of a succeeding motor, the slave motor, in order to maintain a prescribed draw ratio. Where a plurality of motors are involved, this relationship continues throughout the succession of motors in the drive system in order to maintain the predetermined draw ratios between each pair of motors. Such systems are commonly used in continuous process manufacturing, such as in the manufacturing of synthetic fibers where a strand or web of material is processed from a supply point through various stages to the finished product. The speeds of the various motors throughout the system will affect the characteristics of the manufactured fiber. In such applications the draw ratios vary over a very narrow range, and it can be anticipated that no motor in the system will have difficulty in meeting the demands placed on it for speed variation. Examples of such systems are to be found in U.S. Pat. Nos. 3,118,097 and 3,447,050.

Multimotor drive systems can find application, as well, in apparatus where one or more motors in the system will have difficulty in meeting the load or speed demand placed on it. An example of such an application, which will be described in greater detail hereinbelow, is an apparatus wherein it is necessary to use more than one motor to drive two or more mechanical members which are used to move an implement through a prescribed path. For example, in a power shovel it may be necessary to provide for the simultaneous rotation and extension of the handle on which the dipper is mounted, and it will be necessary that there be a given relationship between the hoist speed, i.e., the speed of rotation of the dipper handle and the crowd speed, i.e., the speed of the longitudinal movement of the handle in order to effect motion of the dipper through a predetermined digging path. During this operation for a variety of reasons it may be the case that a commanded one of the motors might not be able to run at the commanded speed; for example, in order to maintain the prescribed speed ratio a motor may be commanded to operate at a speed which is beyond its maximum safe design speed. In another situation the motor might not have the capability of delivering the required horsepower at the commanded speed. It also may be the case that an operator in anticipating a given situation might cause a motor being commanded to operate at one speed to operate at a lower speed which would have the effect of taking the speed of the motor outside of the prescribed ratio. In all of these situations if the implement is to continue to move through the desired path, the ratio of the hoist speed to the crowd speed must be maintained and therefore, there must be a change in speed of the commanding motor, as well as the commanded motor.

In other applications involving excavators and the like it may be necessary that the aforementioned speed ratio might have to be varied over a relatively wide range during normal operating cycles. Again, in order to accomplish this it is necessary that the commanding motor be adjusted to take into consideration other influences on the commanded motor.

In the prior art control systems such as those discussed hereinabove in continuous process manufacturing no provision has been made for adjusting the speed of operation of the commanding motor, when for some reason the commanded motor is incapable of or, for example, has been manually adjusted to not respond or is caused to operate at a speed which would change the speed ratio to an undesirable value in the absence of some change in the speed of operation of the commanding motor. Thus, the prior art ratio control systems make no provision for maintaining a given speed ratio between two or more motors when one or more of the commanded motors is unable to respond to cause the system to operate at the prescribed draw ratio.

It is, therefore, an object of this invention to provide means and method for coordinating the speeds of two or more motions so as to establish and maintain a prescribed relationship between those speeds.

Another object of this invention is to provide means and method for coordinating the speeds of two separately driven mechanical motions so that an implement moved by the joint operation of the two motions will follow a prescribed path.

Still another object of this invention is to provide means and method for adjusting two or more sources of motive power to have predetermined speed ratios therebetween where the speed ratios are varied to provide for mechanical motion through a prescribed path.

A further object of this invention is to provide means and method for maintaining a given speed ratio between two sources of motive power, wherein the sources reciprocally command each other, as when a commanded source is unable to reach a speed value communicated by a commanding source so that the former will then in effect command the latter to produce the desired speed ratio.

An additional object of this invention is to provide in a power shovel or the like means for controlling the speed of the motions whereby an implement such as a dipper is moved and the motion of the dipper is maintained in a prescribed path.

SUMMARY OF THE INVENTION

The forgoing and other objects are attained in a method and apparatus for controlling the speeds of at least two sources of motive power, and thereby the motions they drive by controlling the speed of each source with a signal having a value proportional to a predetermined ratio of one speed to the other and either proportional or inversely proportional to the speed of the other motor. The positions of the first and second motions driven by the motors are sensed and a signal having a value corresponding to the desired ratio of those speeds is produced. Each motor is coupled to a speed transducer which produces an electrical signal having a value corresponding to the speed of that electrical motor. Depending on which ratio is used the signal corresponding to the value of the speed of each motor is either multiplied by or divided by the speed ratio. When such signals are derived, each is coupled to a motor other than the one from which the speed was taken to perform the aforementioned computation. The results of these mathematical operations are communicated to speed regulating devices which govern the speeds of operation of the respective motors.

As indicated hereinabove, in many situations it is desirable that, for example, an operator be able to control one or both of the speeds of the motions in question. Accordingly, a reference signal is generated for each speed to be so controlled, and this reference signal is compared with the one of the signals being supplied to the motor resulting from the signal computation operation discussed hereinabove. In this case the minimum of the values of these two signals is chosen for governing the speed of the motor in question.

The speed control mechanism described above yields a means by which the path of an implement can be precisely controlled when that implement is being moved by means of more than one mechanical motion. Thus, for example, in the case of a power shovel the hoist and crowd speeds can be precisely controlled to produce a ratio of those two speeds which will cause the dipper to operate over a predetermined path.

BRIEF DESCRIPTION OF THE DRAWINGS

The principles of the invention will be more readily understood by reference to the following detailed description of a preferred embodiment in conjunction with the drawings which are briefly described as follows.

DETAILED DESCRIPTION OF A PREFERRED EMBODIMENT

Figure 1:
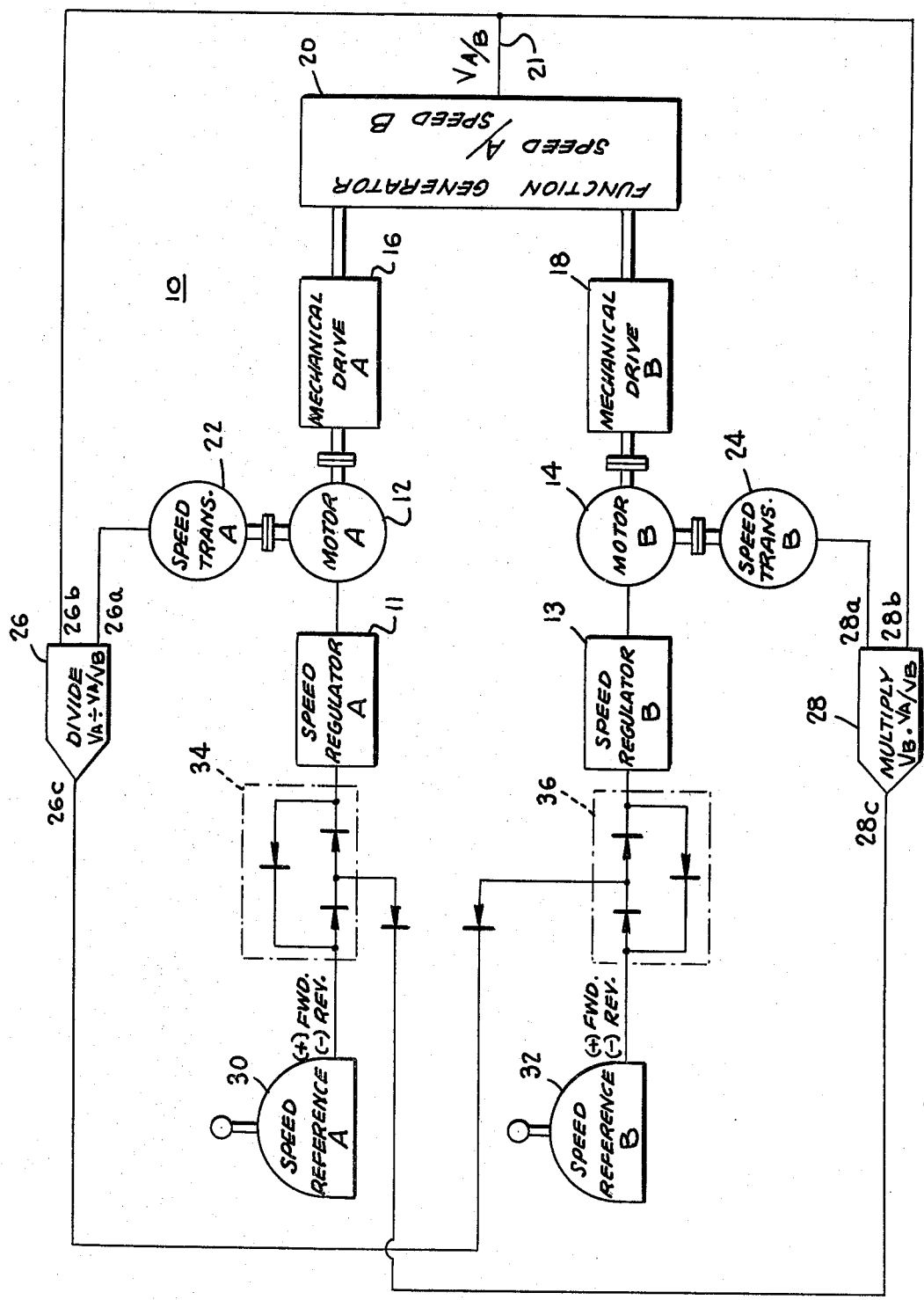
FIG. 1 is a block-schematic diagram of a preferred embodiment of a system for regulating the speeds of two motors in accordance with the principles of the invention.

FIG. 1 is a block-schematic diagram of a control system for regulating the speeds of two motors in accordance with the principles of this invention. System 10 includes two sources of motive power, which in this embodiment are electric motors, motor A,12, and motor B,14. In the conventional manner the speeds of these motors are respectively controlled by speed regulator A,11 and speed regulator B,13. As indicated, these speed regulation devices may be of conventional construction and of a type particularly suited to the specific kind of motor involved. Motor 12 and motor 14, respectively, are connected to provide the motive power for mechanical drive A,16 and mechanical drive B,18; these may be any form of mechanical load and one particular structure for providing such loads is described hereinbelow. A function generator 20, which might assume a variety of forms, an example of which is described in detail below, continuously senses the mechanical motion and positions of the two drives 16 and 18 and at line 21 produces a voltage signal having a value corresponding, in this case, to the desired ratio of the speed of drive 16 to the speed of drive 18.

Simultaneously, the speeds of motors 12 and 14 are sensed, respectively, by speed transducers 22 and 24 which in this preferred embodiment might take the form of tachometer-generators. An electrical signal having a value corresponding to the speed of motor 12 is supplied from transducer 22 to input 26a of an electronic divider circuit 26. The output from function generator 20 is supplied to input 26b. The electronic divider circuit in the conventional manner produces a signal at 26c which is of a value corresponding to the quotient of the signal appearing at input 26a divided by the signal appearing at input 26b; this yields the quotient of the speed of motor 12 divided by the speed ratio produced from function generator 20. Correspondingly, the output signal from transducer 24 having a value corresponding to the speed of motor B is supplied to an input 28a of an electronic multiplier 28. Input 28b also receives the ratio signal from function generator 20. This circuit in the conventional manner produces a signal having a value corresponding to the product of input 28a multiplied by input 28b or the product of the speed of motor 24 and the ratio produced by function generator 20.

By means of the foregoing electronic computations, control values, and corresponding signals, are arrived at for, respectively, regulating the speeds of motor 12 and motor 14 in accordance with the then existing desired ratio of the speed of motor 12 to the speed of motor 14. These values are then, respectively, compared with reference values, and the results of these comparisons are used to govern the speeds of the motors.

More particularly, the output signal appearing at 26c from divider 26 is coupled for regulation of the speed of motor 14. The output signal appearing at 28c from multiplier 28 is coupled to the regulation circuitry of motor 12 for regulating the speed of that motor. Of course, in the conventional manner these signals actually are utilized by speed regulators 11 and 13 to control the speeds of motors 12 and 14 accordingly.

Elements 30 and 32 refer to sources of reference control signals for operating the speed regulators 11 an 13. In the preferred embodiment shown herein these sources of control voltages are arranged to be manually adjustable so that an operator can control, if desired, the speeds of one or both of the motors. Generally, it is not possible where a precise amount of manual control is desired for an operator to effectively control both motions being driven, and the invention described herein then assumes greater importance.

For controlling the speed of motor 12 the outputs from 28c and from reference source 30 are individually coupled to a minimum-seeking diode logic network 34, constructed as shown in the drawing, which functions as a comparator to select and pass on to speed regulator 11 the one of the inputs it receives which has the minimum value. Accordingly, motor 12 will be controlled by the signal value which is the lesser of the output from reference source 30 or the product of the ratio output from function generator 20 and the speed of motor 14. The speed of operation of motor 14 is controlled in a similar manner. That is, output 26c and an output from reference source 32 are coupled to diode logic network 36 which selects and passes to speed regulator 13 the lesser of the output from reference source 32 or the quotient of the speed of motor 12 divided by the ratio output from function generator 20. The latter signal value then in the conventional manner causes speed regulator 13 to adjust the speed of motor 14 accordingly if that should be necessary.

Figure 2:
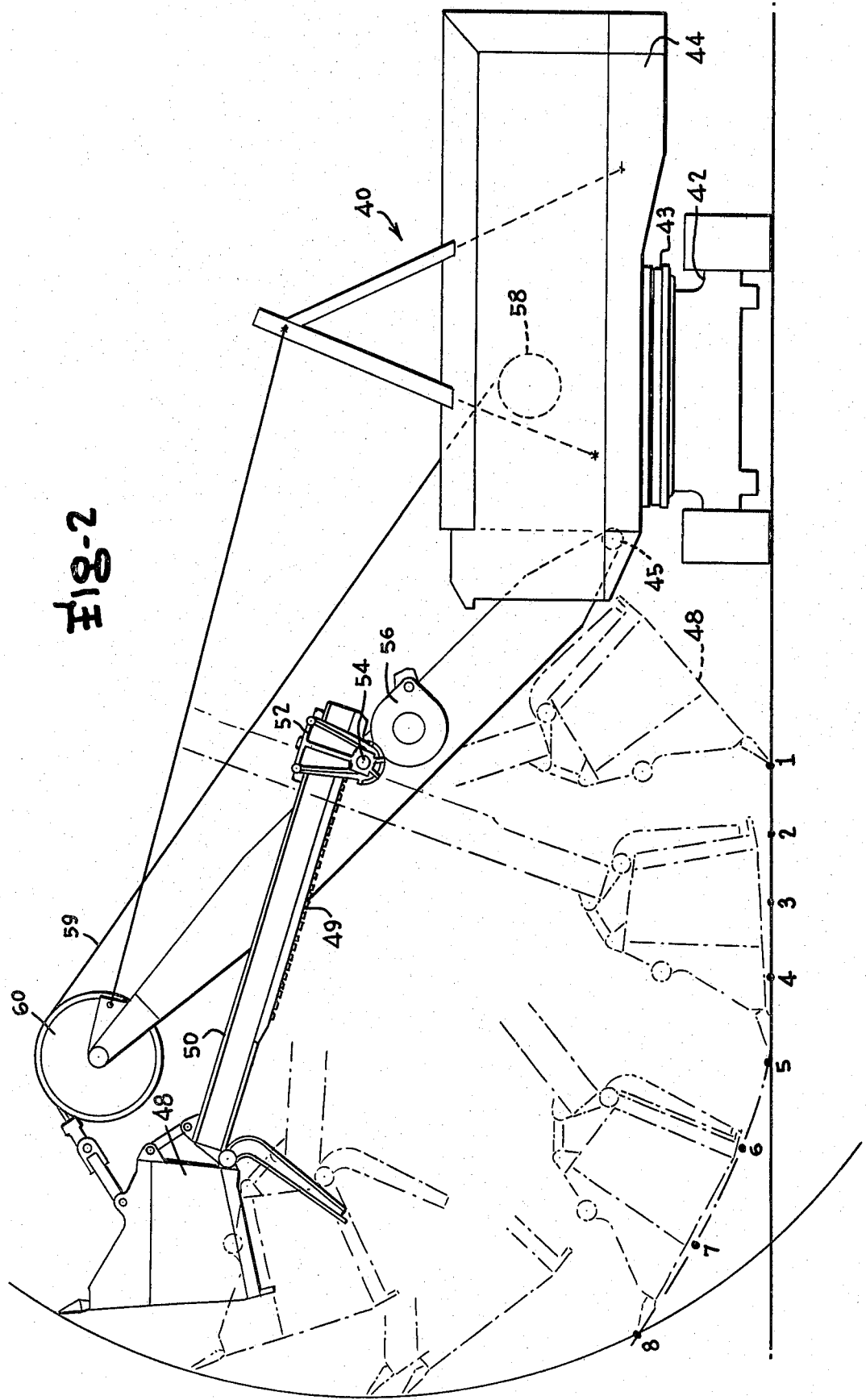
FIG. 2 is a side view of a power shovel utilizing the FIG. 1 preferred embodiment of the invention and includes a range drawing illustrating the dipper path resulting from use of the invention.

FIG. 2 is illustrative of a specific application of the invention disclosed and claimed herein, as well as illustrating an inventive technique for controlling the digging operations of a power shovel through a prescribed path. The specific form of power shovel used forms no part of the invention, and it will be described herein in sufficient detail only for an understanding of the principles of the invention.

Referring to FIG. 2 there is illustrated a power shovel 40 generally including a crawler unit 42 having rotatably mounted thereon a main frame 44, the rotatable mounting being accomplished by a conventional roller circle structure 43. A boom 46 is mounted on main frame 44 by means of boom foot pins journaled therein at 45.

A dipper 48 is mounted on a dipper handle 50, as shown, and rack 49 is carried on dipper handle 50, as shown, for engagement with pinions (not shown) within a yoke 52. This rack and pinion arrangement provides for longitudinal movement of dipper handle 50 relative to boom 46. Yoke 52 is pivotally connected to boom 46 by means of a shipper shaft 54 which is journaled therethrough. This connected arrangement of the yoke to the boom and the placement of the dipper handle within the yoke provides for rotation of the dipper handle 50 about the axis formed by shaft 54 as shown in FIG. 2.

A hoist motor and drum arrangement 58 provides the drive for movement of hoist rope 59 about a boom point sheave 60 rotatably mounted at the point of boom 46. The end of the hoist rope is then connected to the dipper as shown in FIG. 2. This, therefore, provides the drive for the rotational motion of the dipper and dipper handle about shipper shaft 54, referred to herein as the hoist motion.

A crowd motor 56 along with a suitable gearing arrangement is provided and in this embodiment is shown as mounted on the boom 46. This crowd motor and gearing arrangement provides the drive for the pinions (not shown) mounted on shipper shaft 54 which mesh with rack 49 to thereby provide the drive for longitudinal motion of the dipper handle 50. This motion is referred to as a crowd motion and the speed of movement of dipper handle 50 is referred to as a crowd speed.

Generally simultaneously, hoist mechanism 58 is operated to cause rotation of dipper 48 and dipper handle 50 and yoke 52 about shipper shaft 54. The speed with which this motion is carried out is referred to as hoist speed. It is the combination of these two motions and the judicious selection of a ratio of crowd speed to hoist speed which causes the dipper and dipper handle to follow a prescribed digging path as shown in FIG. 2.

Figure 4:
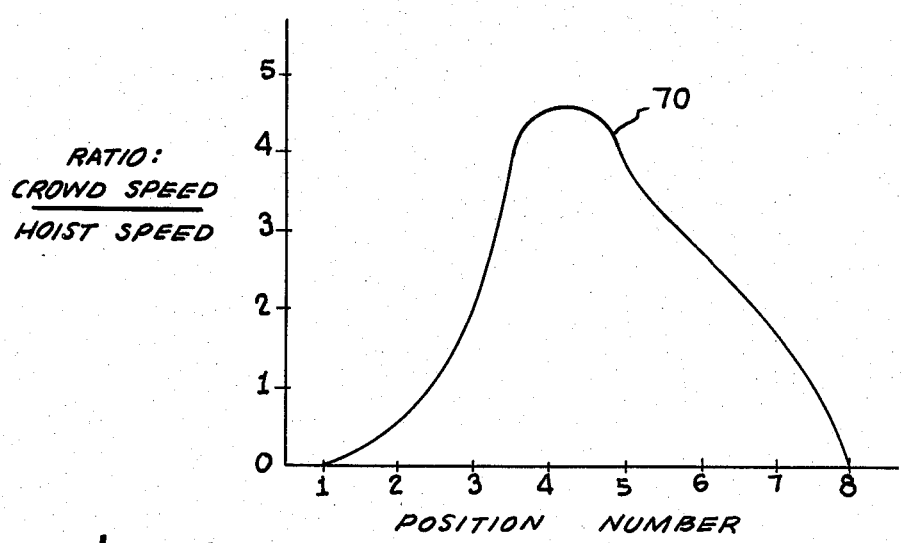
FIG. 4 is a graph illustrating the desired crowd speed to hoist speed ratio for given positions along the digging path illustrated in FIG. 2 which produced the flat, linear digging path as illustrated in that figure.

In conjunction with FIG. 2 reference should now be had to FIG. 4 where the numerals 1 through 8 correspond to like numerals in FIG. 2. Curve 70 in FIG. 4 is a plot of the crowd speed to hoist speed ratios which are necessary for the dipper to sequentially assume each of the positions 1 through 8 as those positions are illustrated in FIG. 2.

As an example of the operation of system 10 to achieve the operational characteristic illustrated in FIG. 4, if the hoist speed were to be maintained at a constant value, perhaps by use of a manually selectable reference speed source, the crowd speed would have to be varied in a manner substantially following curve 70. System 10 would operate to achieve this variation of crowd speed. In such a circumstance, however, it is likely that the crowd motor could not achieve the high speeds required at midposition, i.e., positions 3 through 5, so the hoist speed would have to be reduced in order to follow the prescribed path. Accordingly, system 10 would operate to reduce the speed of operation of the hoist motor below the speed which the operator is attempting to maintain at a constant value. By this means, the desired speed ratio at those points in the prescribed path are maintained, and there will then be no deviation from the prescribed path.

In the case of the operation of a power shovel of this particular type it is probably only desirable that manipulation of the dipper be automated only during that portion of the entire cycle of operation which is illustrated in FIGS. 2 and 4. For purposes of understanding the general principles of operation of the shovel, the operator would manually position the dipper at any desired point on the prescribed digging path, and perhaps, an actuating switch could then be used to initiate the automatic operation. By means of system 10, the dipper would move along the prescribed path. When the dipper is full, the operator will deactivate system 10 and then manually control the dipper through the dumping and return portions of the cycle.

Figure 3:
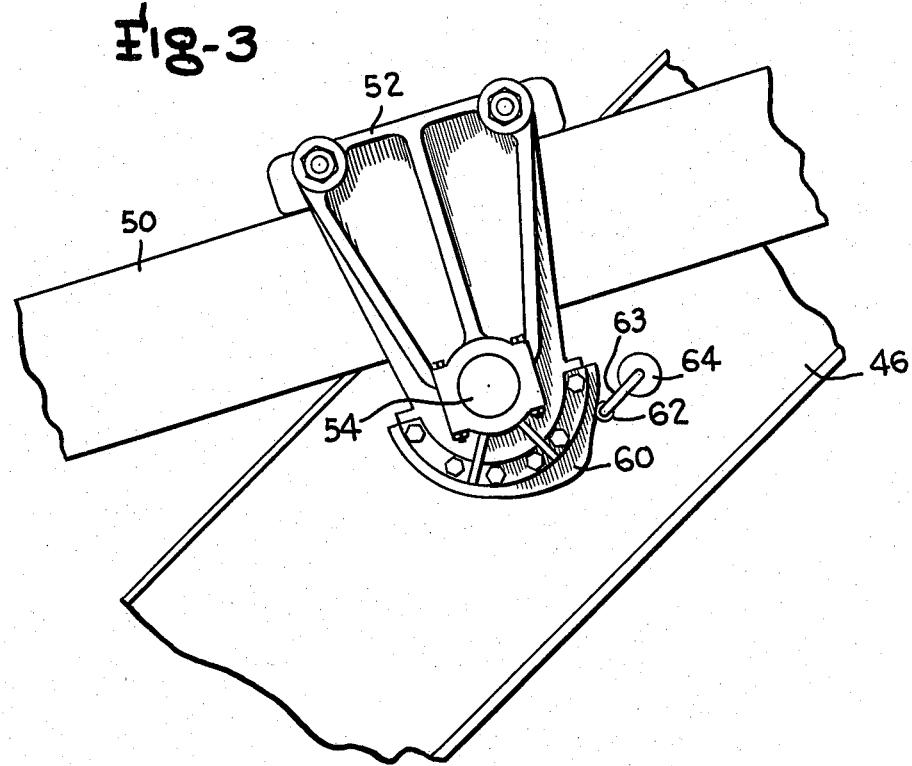
FIG. 3 is a partial side plan view showing portions of the power shovel boom, dipper handle and yoke of the FIG. 2 power shovel and illustrating a preferred embodiment of a mechanism for generating the speed ratio function for the FIG. 1 embodiment.

FIG. 3 illustrates in detail portions of dipper handle 50 and boom 46 adjacent yoke 52 and shipper shaft 54. In addition there is illustrated a cam and roller arrangement for operating a potentiometer 64 to achieve the signal output corresponding to output 21 from function generator 20 in system 10.

More particularly, the lower end of yoke 52 forms a cam surface 60 extending around the periphery thereof. During operation of the shovel yoke 52 will move about shipper shaft 54 in a manner generally following the path of operation of the dipper handle. Cam surface 60 which in this case is shaped to provide the characteristic of curve 70 is engaged by a roller 62 attached to an arm 63 which at its other end is attached to a potentiometer 64. This potentiometer along with a suitable voltage source then provides a voltage which varies according to the prescribed path of operation for the shovel by providing a voltage characteristic which generally follows curve 70 in FIG. 4. This arrangement then provides a function generator which responds to the varying angle between the dipper handle and the boom from which the desired voltage ratio corresponding to the speed ratio is derived.

There are, obviously, a myriad of other ways in the form of mechanical linkages, levers or the like which could be used to drive potentiometers to perform this function. In addition, the cam might be separately driven from yoke 52 by means of levers or the like. Other forms of electrical components can be used to perform the functions of potentiometer 64. For example, digital techniques could be used, and in this instance the potentiometer can be replaced with a conventional digital resolver. Likewise, other types of analog function generating devices suited to the particular application can be utilized.

The principles of this invention are described herein above in connection with a preferred embodiment wherein the system is utilized for the control of crowd and hoist drives in a power shovel. It is contemplated, however, that the invention has a wide variety of applications where it is desirable to maintain a speed ratio between at least two motions, whether that ratio is derived on the basis of position, time or any other suitable parameter. While an analog system is described, an analogous digital system can be used for realizing the principles of this invention. Furthermore, while the preferred embodiment of the invention described herein is described in connection with a conventional type of power shovel it is contemplated that the invention has application for a variety of other types of excavating equipment, as well as in any environment where the maintenance of a given speed ratio between two motions is desired. Accordingly, the specific description given hereinabove is not to be considered as limiting, and the invention should be considered only as being defined by the appended claims.

I claim:

1. A method of coordinating the speeds of two motions, comprising the steps of:
   sensing the speeds of first and second motions,
   producing a first signal having a value corresponding to a desired ratio of the speeds of said first and second motions,
   selecting reference values for said first and second speeds and generating corresponding first and second reference signals,
   producing second and third signals having values corresponding, respectively, to said first and second speeds,
   dividing said second signal by said first signal to produce a fourth signal having a value corresponding to the quotient,
   multiplying said third signal by said first signal producing a fifth signal having a value corresponding to the product,
   comparing said first reference signal with said fifth signal,
   controlling the speed of operation of a source of motive power for said first motion with said fifth signal if the value of said first reference signal exceeds that of said fifth signal and with said first reference signal if the value of said fifth signal exceeds that of said first reference signal,
   comparing said second reference signal with said fourth signal and
   controlling the speed of operation of a source of motive power for said second motion with said fourth signal if the value of said second reference signal exceeds that of said fourth signal and with said second reference signal if the value of said fourth signal exceeds that of said second reference signal.

2. The method defined in claim 1, wherein said sensing step comprises sensing the instantaneous relative positions of means producing said first and second motions.

3. The method defined in claim 2, wherein the step of producing said first signal comprises adjusting a voltage source on the basis of the sensed relative positions of the means producing said first and second motions.

4. The method defined in claim 1, wherein said step of selecting reference value is carried out by manual selection of predetermined outputs from signal sources.

5. Apparatus for maintaining a predetermined ratio between the speeds of at least two motion-producing means comprising:
   first and second sources of motive power for said two motions,
   means for sensing the speeds of said two motions,
   first means for producing a first signal having a value corresponding to the ratio of the predetermined speed of a first of said motions to the speed of a second of said motions,
   second means for producing a second signal having a value corresponding to the speed of said first motion,
   third means for producing a third signal having a value corresponding to the speed of said second motion,
   divider means for producing a fourth signal having a value corresponding to the quotient of said second signal divided by said first signal,
   multiplier means for producing a fifth signal having a value corresponding to the product of said first and third signals,
   first and second reference source means for producing first and second reference signals providing reference values for the speeds of operation of said first and second sources of motive power,
   comparator means for comparing said first reference signal with said fifth signal and said second reference signal with said fourth signal and for producing, respectively, first and second comparator output signals corresponding to the ones of the compared signals having minimum values,
   means for regulating the speed of said first and second sources of motive power, respectively, in accordance with the values of said first and second comparator outputs signals.

6. The apparatus defined in claim 5, wherein said sources of motive power are electric motors.

7. The apparatus defined in claim 5, wherein said means for sensing operates to sense the relative positions of the motion-producing means.

8. The apparatus defined in claim 7, wherein said first means for producing comprises an adjustable voltage source operable responsive to the relative positions of the motion-producing means.

9. The apparatus defined in claim 5, wherein said second and third means for producing are generating means for producing voltage signals proportional, respectively, to the speeds of said first and second sources of motive power.

10. The apparatus defined in claim 9, wherein first and second reference source means comprise manually adjustable sources of voltage signals.

11. The apparatus defined in claim 5 wherein said comparator means comprises two minimum seeking diode networks for, respectively, comparing said first reference signal with said fifth signal and comparing said second reference signal with said fourth signal.

12. In a power shovel or the like having an implement moveable over a path determined by the relative speeds of the motions of at least two mechanical members which drive said implement, an apparatus for producing a predetermined speed ratio characteristic for operating said two members, comprising:
- sources of motive power for driving said two members;
- means for sensing the relative positions of said two members for producing a corresponding ratio signal proportional to the relative speeds of the motions of said two members;
- computing means responsive to the speeds of operation of said sources for producing control signals having values proportional to said ratio signal; and
- control means for regulating the speeds of operation of said sources in accordance with the values of said control signals.

13. A method of maintaining a predetermined speed ratio between at least two motions driven, respectively, by two separately and independently controlled motive power sources, comprising the steps of:
- producing two control signals, respectively, from the sensed speeds of the two motions and from the value of said predetermined speed ratio and
- controlling the speed of operation of one of the two motive power sources driving one of the motions with one of said control signals and separately controlling the speed of operation of the other motive power source driving the other motion with the other of said two control signals.

* * * * *